S. R. Wilmot,
Drag Saw.
No. 424.
Reissued Jan. 27, 1857.
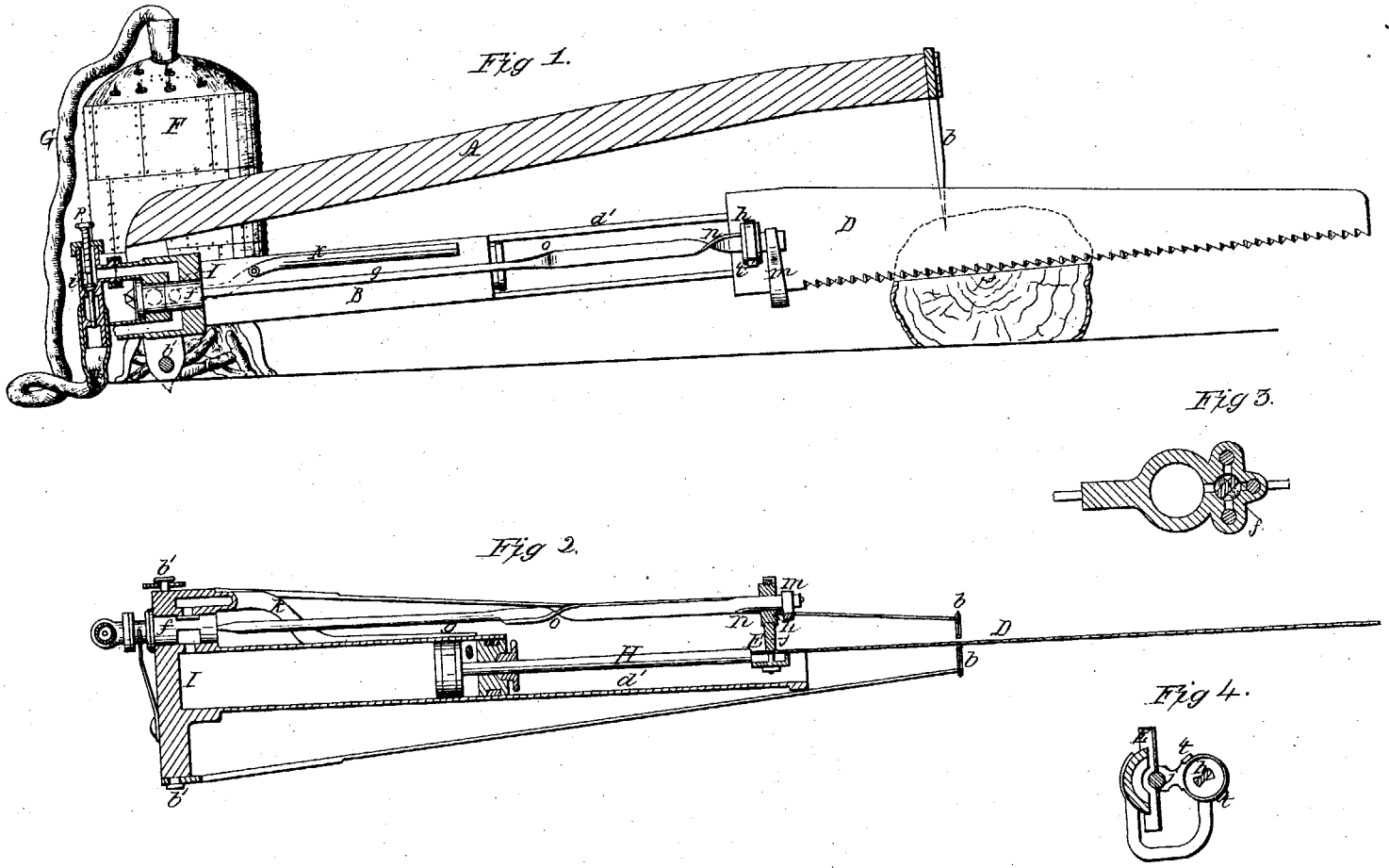
AM. PHOTO-LITHO. CO. N.Y. (OSBORNE'S PROCESS.)

UNITED STATES PATENT OFFICE.

SAMUEL R. WILMOT, OF NEW YORK, N. Y.

PORTABLE STEAM SAWING-MACHINE.

Specification forming part of Letters Patent No. 13,444, dated August 14, 1855; Reissue No. 424, dated January 27, 1857.

*To all whom it may concern:*

Be it known that I, SAMUEL R. WILMOT, of the city, county, and State of New York, have invented a new and useful Portable Steam Sawing Apparatus, of which the following is a full, clear, and exact description, reference being had to the drawing which is hereunto annexed, in which—

Figure 1 represents a side view of the apparatus with the valve-chest in section; Fig. 2, a longitudinal section of the apparatus at right angles to the plane of the saw; Fig. 3, a transverse section of the valve and steam-passages, and Fig. 4 a section of the valve-gear and saw and of the apparatus for guiding the latter.

My invention, although applicable to various purposes, is specially adapted to the cutting down of trees and to cross-cutting them into logs of suitable length.

The object of my invention is to permit a steam-sawing apparatus to be moved from tree to tree with facility and to diminish its weight; and my invention consists in rendering the saw, the engine for driving it, and the apparatus for securing the whole in a stationary position while the saw is at work independent of any fixed or inflexible connection with the boiler for generating steam to supply the engine, but at the same time connecting them therewith in such manner that the steam connection between the sawing apparatus and the boiler is not broken by shifting the position of the former with respect to the latter. This part of my invention is of peculiar advantage in apparatus designed for cutting down trees, as will appear from the following considerations.

The boiler of an engine sufficiently powerful to drive a good saw with the requisite force and speed is a heavy object in itself, independent of the water with which it is filled, so that the collective strength of a number of men or the employment of animal force is required to shift it from place to place. The difficulty becomes still greater when the boiler is hot and the fire is burning. Moreover, the difficulty of moving a heavy object in the woods is greatly enhanced by the nature of the ground, and in case animal force is employed for the purpose, or the object is heavy and bulky, a road of some description must be cleared to permit such an object to pass. The nature of the ground is frequently such as to permit the movement of such an object only in particular directions, in which case, if the sawing apparatus be connected with the boiler in such manner that the two must be moved simultaneously or that they must occupy respectively the same relative positions, it would be impossible to apply it to the sawing down of trees standing in positions to which the boiler could not be moved; or, if such trees were felled in the usual manner, it would be impossible to apply the sawing apparatus to cross-cutting them without moving the trees to the machine.

By constructing the sawing apparatus complete in itself so far as regards the motor, the saw, and the apparatus for making it fast, but in such manner that it may be moved about independent of the boiler without breaking the steam connection therewith, the weight of the sawing apparatus to be moved from tree to tree may be made so light as to render a steam sawing apparatus strictly portable, so that while the heavy boiler remains stationary during the greater part of the time, and need be moved only at intervals and in the direction most convenient, the light steam sawing apparatus may be moved by hand from tree to tree and applied and operated in any suitable position thereto, either to cut them down or to cross-cut them when fallen into pieces of suitable length without reference to the formation of the ground. Moreover, this invention permits the employment of two or more independent saws in connection with one boiler, whereby the first cost is lessened. The cost of operating the apparatus is also lessened, as but one attendant is required to fire the boiler for two or more saws, while the facility of sawing down trees situated at variable distances and in a variety of positions is greater than if each sawing apparatus were fitted with a boiler attached rigidly to it.

My invention may be applied to practice by different modes of construction, or by arranging the parts of the apparatus which embodies it upon different plans. In the portable steam sawing apparatus represented in the accompanying drawings the saw D is secured to the outer extremity of a piston-rod, H, whose opposite extremity passes through a suitable stuffing-box into a steam-cylinder, B, and is made fast to the piston C thereof. The steam-cylinder is formed out of a wrought-iron tube similar to those employed in conveying gas or water, one portion of which is bored truly to serve as the steam-cylinder, while another portion is formed into a guide, *d'*, upon which the brasses of the cross-head E at the outer end of the piston-rod move in order to guide the latter and the saw. The butt of the steam-cylinder is secured very firmly in a block of metal, I, which contains the steam-valve *f* and the steam-passages. One of the latter proceeds directly from the valve to the adjacent end of the steam-cylinder. Another one of these passages is prolonged by the addition of a tube, *k*, which forms a side pipe, to convey steam to and from the end of the steam-cylinder which is nearer the saw. The steam-valve is of the four-way-cock variety. Its axis is parallel with the direction in which the piston moves, and it is opened from the piston-rod by a valve-motion of peculiar construction, as follows: The valve-stem *g*, by which the cone of the cock is turned, is extended parallel with the piston-rod, and is pivoted in an arm, *m*, secured to the extremity of the guide *d'*. This valve-stem is flattened for that portion of its length which corresponds with the stroke of the cross-head E, and is bent or twisted at two points, *n* and *o*, to the same extent that the valve must be turned in order to change the flow of steam from one end of the steam-cylinder to the other. The flattened portion of the rod is traversed by a slide, *h*, which is secured in a ring socket in an arm, *j*, projecting from the cross-head E of the piston-rod. This slide is secured in its socket in such manner that it can turn upon the axis of the valve-stem a sufficient distance to turn upon the twisted portions of the valve-stem in moving from either extremity of its stroke toward the center thereof, and also that it shall not turn in the socket of the arm, but shall force the twisted portion of the valve-stem to twist or turn in it when moving from the center of its stroke to either extremity thereof. This limitation of the turning of the slide is effected in this instance by two stops, *t t'*, which alternately come in contact with the opposite sides of the arm that supports the slide.

The steam-passage, by which steam is admitted from the boiler to the steam-valve is closed by a throttle-valve, *i*, which opens towards the steam-valve, and is forced down upon its seat by a screw, *p*, to throttle or stop the flow of steam from the boiler. The screw *p* is disconnected from the valve, so that when it is screwed out of the valve-chest the valve is free to open whenever the pressure in the boiler exceeds the pressure in the steam-chest, but will close by its weight and shut off the communication with the boiler whenever the pressure in the steam-chest exceeds that in the boiler. The block of metal to which the engine is made fast is connected by pivots *b b* with a stock, A, which extends in the direction of the saw, and is fitted at its farther extremity from the block with dogs *b b*, which extend on each side of the saw, and are driven into the tree or log to be sawed, and secure the whole apparatus firmly thereto. The steam-chest is connected with a steam-boiler, F, by means of a flexible pipe, G, which may be made of vulcanized india-rubber, or of canvas cemented therewith sufficiently strong to stand the greatest pressure to which the steam should be raised. The boiler may be of any convenient and suitable form, and, as an economical consumption of fuel in the woods is not a matter of much importance, it is recommended that it be made of the simplest form and of the smallest size which will furnish sufficient steam to do the work of sawing.

When this apparatus is to be used in cutting down and cross-cutting trees, the boiler is planted in the woods in some convenient position, and the flexible pipe is attached to the boiler and to the portable steam sawing apparatus. As soon as the steam is got up, the sawing apparatus is applied to a tree with the saw in a horizontal position by driving the dogs into the tree and by supporting the heel of the machine, if necessary, by blocks or other means. The piston is set at the butt of the cylinder, steam is admitted to the valve by turning up the throttle-valve screw, and the saw is pressed against the tree by prying between the cylinder or the slide and the stock. As the steam passes through the valve and presses upon one side of the piston, it forces the latter forward and impels the saw against the wood, at the same time carrying the slide *h* along the valve-stem. As the slide approaches the forward end of its stroke it acts upon the twisted portion of the valve-stem, and turning the latter and the valve changes the flow of steam from one side of the piston to the other. As this change is effected while the piston is still moving forward, the steam from the boiler enters in the space of the cylinder through which the piston must pass to complete the stroke of the saw, and forms a cushion to check the momentum of the moving parts and prevent the striking of the piston against the head of the cylinder. This cushioning of the piston by the steam is enhanced by the peculiar formation of the throttle-valve, which closes whenever the pressure of the steam in the cylinder begins to exceed that in the boiler, thus preventing its recoil into the boiler, imprisoning it in advance of the piston, causing it to constitute an elastic cushion which the momentum of the moving parts cannot overcome, and effectually preventing the jarring of the apparatus. As soon as the elasticity of the steam-cushion has overcome the momentum of the piston and its accessaries the latter begins to return in the cylinder under the pressure of the imprisoned steam, carrying the saw back with it over the wood. In this backward movement the slide *h* repasses over the twisted part of the valve-stem, but from its construction, as before described, turns in its arm without imparting motion to the valve, and consequently the steam from the boiler is free to enter the cylinder and press against the piston as soon as the pressure caused by the cushioning of the steam is reduced sufficiently by the onward movement of the piston to permit the throttle-valve to rise under the pressure of the steam in the boiler. The saw is forced on by the steam acting upon the piston until the latter approaches the butt of the cylinder, when the slide again turns the steam-valve and causes the reversion of the movements of the piston and saw. The saw is thus driven to and fro against the wood and quickly forms a deep kerf. As it buries itself in the wood one or more wedges are entered in the kerf and are driven in as the sawing proceeds, to keep the kerf from closing by the weight of the tree, and also to give the tree a tendency to fall in the required direction.

As the connection between the sawing apparatus and the boiler is flexible, the former may be applied to cutting down all the trees within a circle of which the boiler is the center and the flexible pipe the radius, without moving the boiler, and the fallen trees may be cross-cut in pieces of the desired length. In effecting the latter operation the heel of the stock A rests upon the ground, as shown at Fig. 1, and the saw feeds itself into the wood by its weight.

When all the trees within convenient reach of the boiler have been cut up, the latter may be moved to permit a new group to be cut. As the sawing apparatus and the boiler are, as regards any fixed attachment independent of each other, each may be set in the position in which they will operate to the best advantage. Moreover, two or more portable steam sawing apparatus may be worked in connection with one boiler. A steam sawing apparatus upon this independent principle may, in fact, be made so portable that a single man can carry it about from tree to tree and operate it, even when of a size sufficient to cut down trees of two feet in diameter and to employ a steam-boiler of four horse-power to generate steam for it.

I do not claim in the abstract the principle of conveying steam by means of a flexible pipe, as I am aware that flexible pipes have long since been used to convey steam and other elastic fluids; but

What I claim as my invention, and desire to secure by Letters Patent, is—

An independent portable steam sawing apparatus constructed substantially as herein set forth, and connected in such manner with the boiler for generating steam that the steam sawing apparatus can be moved from tree to tree, or applied in different positions at different parts of the same tree without moving the steam-boiler or breaking the steam connection therewith.

In testimony whereof I have hereunto subscribed my name.

SAMUEL R. WILMOT.

Witnesses:

THEODORE S. BUEL,
ED. B. COOKE.